(12) United States Patent
Meredith

(10) Patent No.: US 9,816,606 B1
(45) Date of Patent: Nov. 14, 2017

(54) INCREMENTAL GEAR SHIFTING DEVICE

(71) Applicant: Jeffrey Owen Meredith, Del Mar, CA (US)

(72) Inventor: Jeffrey Owen Meredith, Del Mar, CA (US)

(*) Notice: Subject to any disclaimer, the term of this patent is extended or adjusted under 35 U.S.C. 154(b) by 639 days.

(21) Appl. No.: 14/172,881

(22) Filed: Feb. 4, 2014

Related U.S. Application Data

(60) Provisional application No. 61/760,534, filed on Feb. 4, 2013.

(51) Int. Cl.
*F16H 29/04* (2006.01)
*B62M 25/04* (2006.01)
*F16H 59/04* (2006.01)

(52) U.S. Cl.
CPC ............ *F16H 59/04* (2013.01); *B62M 25/04* (2013.01)

(58) Field of Classification Search
CPC . F16H 59/04; G05G 1/04; G05G 7/04; B62M 25/04; B62M 25/045; B62K 23/06; B61H 13/02
See application file for complete search history.

(56) References Cited

U.S. PATENT DOCUMENTS

| | | | | | |
|---|---|---|---|---|---|
| 3,418,867 A | * | 12/1968 | Tetsuo | ............... | B62K 23/06 74/470 |
| 3,481,217 A | * | 12/1969 | Tetsuo | ............... | B62K 23/06 74/489 |
| 3,693,469 A | * | 9/1972 | Ozaki | ............... | B62K 23/06 74/489 |
| 4,267,744 A | * | 5/1981 | Yamasaki | ............ | B62M 25/04 474/82 |
| 4,731,046 A | * | 3/1988 | Juy | ............... | B62M 25/04 474/80 |
| 4,876,913 A | * | 10/1989 | Romano | ............... | B62M 25/04 74/473.13 |
| 4,920,818 A | * | 5/1990 | Nagano | ............... | B62M 25/04 74/473.13 |
| 5,222,412 A | * | 6/1993 | Nagano | ............... | B62K 23/06 74/489 |
| 5,622,083 A | * | 4/1997 | Kirimoto | ............ | B62M 25/04 74/473.21 |

* cited by examiner

*Primary Examiner* — Adam D Rogers
(74) *Attorney, Agent, or Firm* — Donn K. Harms

(57) ABSTRACT

A gear shifting device, for engagement to bicycle or other device, for actuating a translating to actuate sequential shifts in a gear train, is provided. A base of the device engages with one or a plurality of index plates which employ sequential detents to regulate a distance rotated by a cable spool which translates a cable to acuate shifting. The index plate may be interchanged to one having detents matching a new gear train when users change their bike configuration.

11 Claims, 4 Drawing Sheets

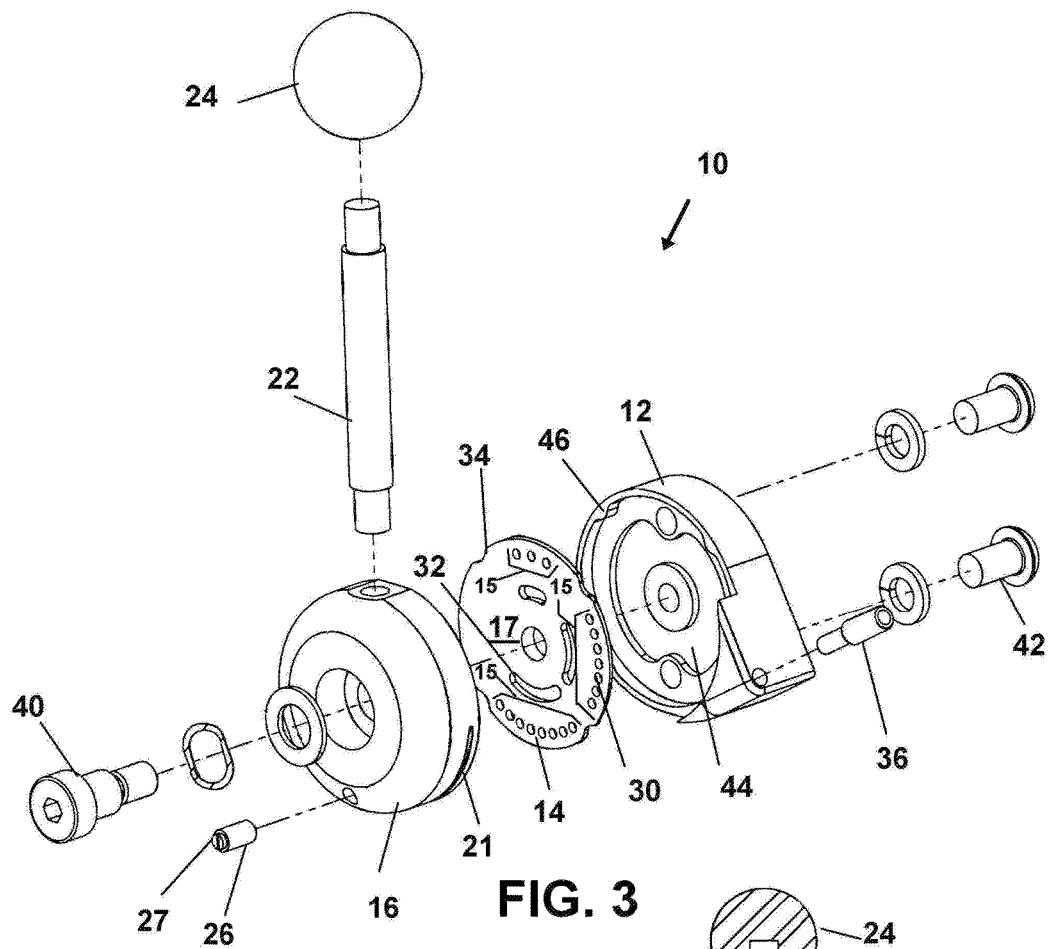
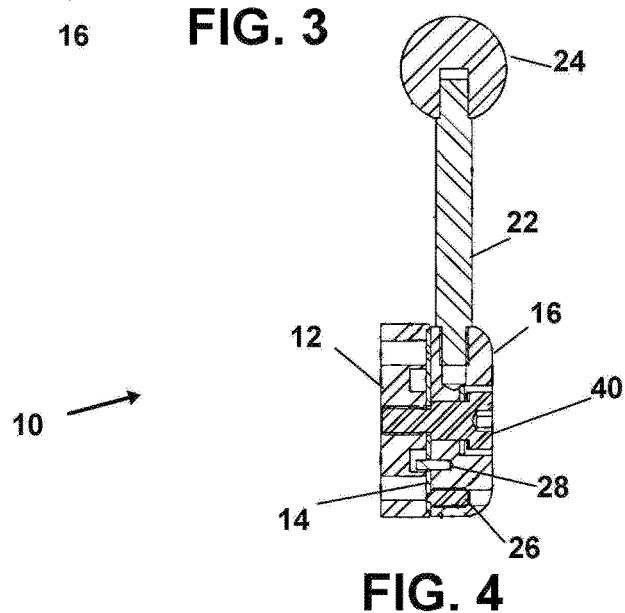

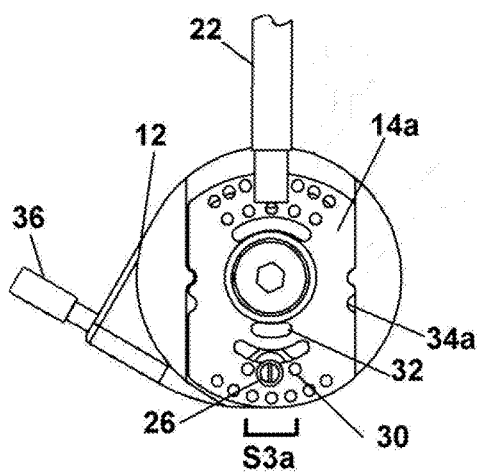
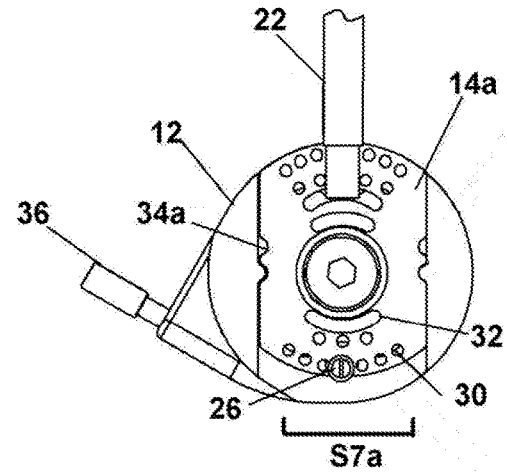
FIG. 11                FIG. 12
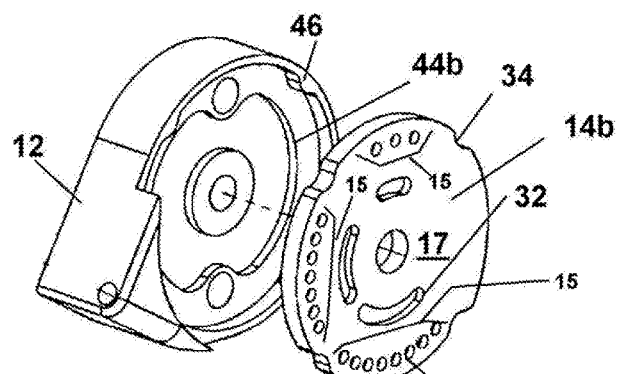
FIG. 13
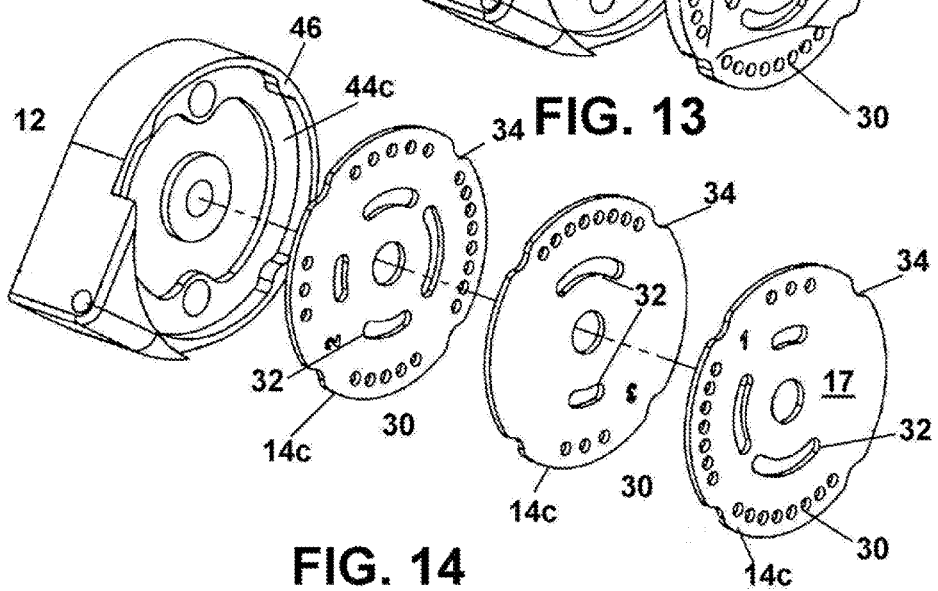
FIG. 14

INCREMENTAL GEAR SHIFTING DEVICE

This application claims priority to U.S. Provisional Application Ser. No. 61/760,534, filed on Feb. 4, 2013, and included herein in its entirety by reference thereto.

BACKGROUND OF THE INVENTION

1. Field of the Invention

The present invention relates generally to gear shifting devices for bicycles and other ridden vehicles having cable-actuated shifters. More particularly, the invention relates to an incremental gear shifting device employable to change gears on bicycles having conventional Bowden cables communicating with internally geared multi-speed rear hubs and derailleurs. The device includes an index plate having multiple sets of indexing apertures and limiting slots. Registered engagement of the index plate with a cavity allows the user to choose the set of indexing apertures which matches the shift points of a particular internally geared hub or derailleur in order to translate a precise amount of cable in preset increments as a shifting lever is pulled or rotated.

2. Prior Art

Bicycles have been in existence for centuries and are considered a most favorable means of transportation throughout the world. The majority of bicycles conventionally known in the art employ a chain to transmit power from the human operated crank to the rear wheel which is referred to as the drive train. More recently in history, gearing of the bicycle drive train has been employed which essentially determines the torque required to rotate the pedals and the relation between the the rate at which the rider pedals the crank, and the rate at which the rear wheel turns. This relationship between force required to rotate the pedals and the rate the pedals are rotated to rotate the drive wheel is determined by the size and number of teeth of the gear employed on the crank, and the size and number of teeth of the gear employed on the rear wheel, wherein the relationship is referred to as the 'gear ratio'.

The majority of modern bicycles employ multiple gears on the pedal axle as well as the drive wheel axle and thus are capable of multiple gear ratios between the two and changing the mechanical advantage of the system to the riding conditions and user strength. Conventionally, a gear shifting device is provided which allows users to select the appropriate gear ratio as needed for the application of a comfortable pedal force to yield improved riding efficiency depending on their certain riding style, the terrain, or simply the rider's current preference.

As a simple example, it is conventional for riders to employ a high gear ratio (i.e. large gear at the crank, and smaller gear at the rear wheel) when cycling downhill since the torque required to turn the pedal is lessened by gravity acting on the bike during a downhill run. A medium gear may generally be employed when cycling on a flat road where there is little uphill resistance which would increase pedal torque requirements.

Riding uphill, where gravity acts to increase the torque required on the pedals, a low gear ratio (i.e. relatively smaller gear at the crank, and a larger gear at the rear wheel) is employed.

Although many gear shifting systems have been taught throughout history, there are mainly two especially preferred shifting systems employed widely today, one employing derailleur gears, and the other, internal hub gears.

Derailleur gears comprise multiple sprockets of different sizes employed on one or both of the crank and rear wheel, and a shifting mechanism and biased take-up of the chain to allow the chain to adapt from one sprocket to another to achieve the desired gear ratio. Internal hub gears consist generally of planetary or epicyclic gears which are sealed and lubricated within a shell of the hub gear. Briefly, the number of available gear ratios is generally referred to as the 'speed' of the bicycle, that is, a gear system capably of 3 gear ratios is referred to as a '3-speed', a gear system having 5 different possible gear ratios is a '5-speed', and so forth.

Although there exists some advantages of employing one system over the other, the choice of which system to employ is more than often merely the personal preference of the designer. Further, since the inception of the Bowden cable in the late 1890's, both shifting devices are capable of shifting operation via the translation of the cable by a shift lever employed by the user for gear selection. In general, the shift lever and operatively engaged cable are employed to translate a precise amount of cable, in preset increments, as a shifting lever is pulled or rotated a distance, in order to move the chain from one sprocket to another in derailleur type gears, or to change the gear ratios within the planetary gears for internal hub type gear systems. As a brief note, the length the cable translates between the present incremental points corresponding to different gear ratios is generally referred to as the 'cable-pull'.

Currently, due to the competitive market of bicycles and brand recognition, many manufacturers of internally geared bicycle hubs and derailleur gears additionally manufacture proprietary shifters. As a result of such proprietary components, many shifters are manufactured to only work with one type or model of hub or derailleur.

For example, a shifter mechanism for a certain model derailleur or hub gear may be configured with a specific cable throw and limiting index, which limit the cable-pull between the particular increments. The shift lever can be pulled or rotated about in a manner determined by the amount the cable needs to translate in either direction, to shift between gears of that specific gear system. Manufacturers may vary the increments to fit only their systems.

In addition, when changing parts, upgrading components, or performing maintenance on a bicycle, it is common for users to keep the same bicycle frame, but interchange the gearing systems as needed to change the bike from a 3-speed to a 5-speed, a 5-speed to a 7-speed, and so forth. Thus, users wishing to perform this task are frequently required to change both the gear system as well as the shifting mechanism, since the new gear system is only adapted to a proprietary shifter.

As could be imagined, this requirement, to change both shifter and shift system, can be quite costly especially in the event the user is moving to a gear system with a substantially increased number of potential gear combinations, typically having more components and therefor more costs. Further, in the event of repair or replacement of damaged parts, the user is required to employ only certain and sometimes proprietary parts and components which match their current manufacturer proprietary gear and shifter set, which may be difficult to acquire for out-dated or specialty manufacturers.

Currently, there exists no gear shifting device which is capable of adaptation cable translation for shifting to various gear system types, varying numbers of gear ratio combinations, brands, and manufacturers. This is due to the inconsistences with length and increments of cable pull required to shift between gears between different manufactured systems.

As a result, there is a continuing unmet need for a incremental gear shifting device which is configurable for operation with a plurality of different gearing systems by differing manufacturers, and varying gear ratios, by employing means for selecting from one of a plurality of available cable throw configurations. Such a device should provide this ability to change shifting configurations to the task at hand through the provision of an adjustable and replaceable index plate adapted to one or a plurality of manufactured systems.

Such a device should be adaptable to operate in concert with a plurality of known gear systems thereby providing a shifting device which is universally adaptable and employable and easily repaired or altered. Such a device, through the employment of an index plate having multiple sets of indexing apertures, and limiting slots, should be easily configurable to provide the user with a means for choosing the set of indexing apertures which is operable with the shift points of a particular internally geared hub or derailleur in order to translate a precise amount of cable, in preset increments, to afford precise shifting as a shifting lever is pulled or rotated.

The forgoing examples of related art and limitation related therewith are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF THE INVENTION

The device herein disclosed and described provides a solution to the shortcomings in prior art and achieves the above noted goals through the provision of a gear shifting device configured for an engagement to a plurality of conventional cable operated bicycle gear changing systems. To provide for such interchangeability, the device is configured to allow the user to select any one set of a plurality of sets of indexing apertures and related limiting slots, each of which is configured to operate in combination with, and match, the shift points of a particular brand of internally geared hub or derailleur gear system connected to the distal end of a cable.

Upon a selection determined by the user, and operative engagement with a matched gear changing system, the shifter device herein is configurable to translate a precise amount of cable, in preset increments, to impart rotation or actuation of a shifting lever and thereby change the gears contacting the drive chain on the engaged gear changing system.

In accordance with a first preferred mode, the device includes a base, at least one removably engageable and adjustable index plate, a rotatably engageable cable spool for engaging a conventional Bowden or other type cable at a first end, and a shifting lever. The index plate of the disclosed invention is preferably planar and formed from a rigid material, such as aluminum, steel, carbon fiber, or other suitable metal or material.

In use, the index plate is affixed to a base in a registered engagement thereto positioned between a cable spool and base wherein the spool is permitted to rotate relative to the base in concert with an engaging component for the index plate. The index plate includes at least one but preferably a plurality of individual sets of sequential index apertures. Such index aperture sets are defined by a quantity and a spacing of the index apertures in that particular set, which have been configured to translate an engaged cable to operate particular gear changing components.

For example, one set of index apertures can include three sequential index apertures at pre-defined spacings from each other, which would correspond to operational requirements to translate the cable to operate a 3-speed gear system. A set of five, seven, or eleven sequentially spaced index apertures would be positioned to translate a cable to operate and correspond to a 5-speed, 7-speed, and 11-speed gear changing system, respectively.

It is noted that the spacing of the apertures will vary depending on cable pull requirements to translate the cable either direction at the distal end, and change gear positions of known gear systems. Thus, one index plate may have a plurality of sets of three sequentially spaced index apertures, each having different spacings, wherein each respective set will correspond to provide the respective known cable pull requirements for a known gear system. In operation using a lever, the user will then selectively position the index plate in its engagement in the device in order to translate an engaged cable and achieve the cable pull requirements determined by that particular set, as needed.

The device is intended to be engaged to one end of a cable having a housing and adapted for operative engagement with a conventional cable operated gear system, such as derailleur gears or internal hub gears. A shifting lever is engaged to a cable spool and, upon a rotation or pull of the lever to rotate the cable spool, the cable is drawn in or extended a distance away from the device to provide a means for translating the operatively engaged cable, in preset increments, and cable pull lengths, which are determined by the spacing and number of indexing apertures in the selected set on the index plate.

A limiting pin extending from the cable spool into at least one limiting slot disposed on the index plate, which is associated with a specific set of apertures, provides a means for limiting the overall rotation and the maximum cable throw to ensure the cable is never translated past the operational limits of the particular gear system.

A biased ball or other biased contact component is preferably employed and additionally engaged to project from the cable spool in a position which aligns in a registered engagement with the selected index aperture set, to provide a means for rotating the spool to translate the wire in sequential lengths determined by the spacing of the incremental index apertures of the index plate, which will shift the engaged component. Again, the spacing and number of sequential index apertures in a set, which are engageable by the biased ball or other biased engagement means from the spool, defines the individual cable pull lengths for each respective pull or push of the lever, translating the cable individual lengths relative to a gear selection associated with the gear system.

It is intended that the index plates can be varied in construction to provide the user with a plurality of different index aperture set options for selecting the desired cable pull configuration as their skill and physical endurance increase or decrease. For example, in at least one preferred mode, the index plate could have a set of index apertures disposed on an upper region of the plate, and a different set on a lower region of the plate positioned 180 degrees from the upper region. In this mode, the user will simply rotate the plate 180 degrees in its engagement to the base to operatively position the desired index set in an aligned registered engagement with the biased ball of the cable spool. It is noted, however, that the index aperture sets can also be positioned at 90 degree opposed locations on the index plate, and the user will then rotate the plate in 90 degree turns for selecting the aperture sets disposed at those locations.

In another preferred mode, a plurality of index plates, disposed in a stacked arrangement, can be engaged within the device. The index plate having a first surface positioned adjacent the cable spool, and therefor positionable for a temporary biased engagement with the biased ball, will operate as the active index plate employed for selecting the desired index aperture set and cable pull configuration. Thus, the user can change the stacked arrangement of the index plates such that the desired index plate is positioned for active employment adjacent the cable spool to determine the gear shifting operation of the shifting device desired.

In yet another preferred mode, the index plate can be formed of substantial thickness such that a first side surface of the plate can employ any desired combination of sets of index apertures which extend a first distance (less than the thickness of the plate) into the plate, while the other side surface, opposite the first, can employ any suitable combination of different sets of index apertures extending a distance less than the thickness of the plate. Thus, the user will simply reverse the index plate in its engagement to the base in order to employ one of the index aperture sets on either of the side surfaces.

It is briefly noted that upon a reading of this disclosure, those skilled in the art will recognize various means for carrying out these intended features of the invention. As such, it is to be understood that other devices, applications, and systems employing suitable components may be configured to carry out these features and are therefor considered to be within the scope and intent of the present invention, and are anticipated.

With that being said, with respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods, and systems for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

The objects, features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing any limitations thereon.

BRIEF DESCRIPTION OF DRAWING FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting. In the drawings:

FIG. 3 shows a front perspective exploded view of the device of FIG. 1.

FIG. 4 shows a cross sectional view of the device of FIG. 1 as seen along line AA of FIG. 2.

FIG. 11 depicts a side view of the device of FIG. 8, with the cable spool omitted, showing the index plate, base, lever, and biased ball, with the index plated rotated 180 degrees relative the position shown in FIG. 9, to a third as-used mode configured for a 3-speed gearing system.

FIG. 12 depicts a side view of the device of FIG. 8, with the cable spool omitted, showing the index plate, base, lever, and biased ball, with the index plated rotated 180 degrees relative the position shown in FIG. 10, to a fourth as-used mode configured for a 7-speed gearing system.

FIG. 13 depicts a view of another mode of the device showing the base and index plate, wherein the index plate is formed substantially thicker in order to accommodate a plurality of index aperture sets on both side surfaces thereof.

FIG. 14 depicts a view of another mode of the device showing the base and a plurality of index plates engaged in a stacked arrangement, wherein the user can re-arrange the stacking order of the plates to select the desired index aperture set having the number and spacing of apertures for their gear set.

FIGS. 15-17 depict the ability of the base of the device to be positioned to multiple engagement angles relative to the bike frame, provided by the device, while still allowing for a positioning of the lever in an upright comfortable position for use.

DETAILED DESCRIPTION OF THE PREFERRED EMBODIMENTS OF THE INVENTION

Figure 1:
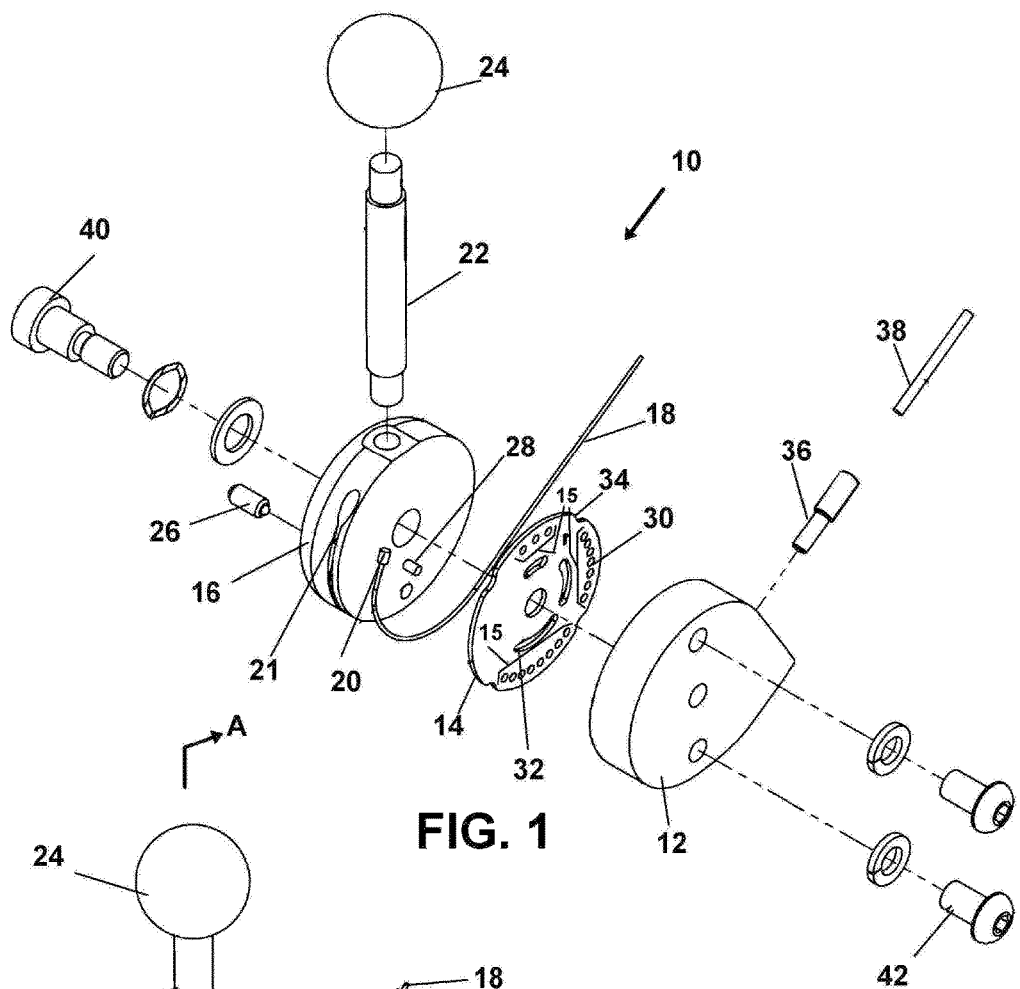
FIG. 1 shows a rear perspective exploded view of a first particularly preferred mode of the incremental gear shifter device comprising generally the base, at least one removably engageable and adjustable index plate, a rotatably engageable cable spool for engaging one end of a conventional Bowden or other type cable, and a shifting lever for rotation.

In this description, the directional prepositions of up, upwardly, down, downwardly, front, back, top, upper, bottom, lower, left, right, and other such terms, refer to the device as it is oriented and appears in the drawings and are used for convenience only; they are not intended to be limiting or to imply that the device has to be used or positioned in any particular orientation.

Now referring to drawings in FIGS. 1-17, wherein similar components are identified by like reference numerals, there is seen in FIG. 1, FIG. 2, FIG. 3, and FIG. 4 views of a first particularly preferred mode of the gear shifting device 10 showing a base 12 and at least one removably engageable and/or adjustable index plate 14 which is rotationally positionable to individual positions relative to a base 12. Also shown is a cable spool 16 which is rotationally engageable with or adjacent to the base 12.

The base 12 is configured for engaging against housing 38 or sheath of one end of a conventional Bowden or other type cable 18 therewith. A proximal end of a translating cable 18 is engageable with the cable spool 16 which is rotatable around an axis by a shifting lever 22 in its position adjacent to one side of the base 12.

The shifting lever 22, by rotating the spool 16 engaged with one end thereof and also engaged with the cable 18 extending from the cable housing, translates the cable 18 at the distal end of the cable housing, a distance one direction or the opposite, depending on the direction of rotation imparted to the spool 16 by the shifting lever 22. In operation, this provides the user a handle-actuated operation of the device 10 to translate the cable 18 and thereby to change gears to a higher or lower gear, depending on the direction of cable translation.

The device 10 is configured for an operative engagement with conventional cable-actuated gear systems (not shown) such as derailleur and internal hub type gear systems which are well known in the art for actuating shift changes by translating a distal end of an engaged cable 18. The device 10 allows the user to select from a plurality of individual sets 15, of a sequentially positioned number of recesses or detents or apertures 30, which depend into a first surface 17 of an index plate 14 and use an interaction of the apertures 30 of the chosen set 15, with an aperture-contacting component engaged to the spool 16, as a shift guide when moving the handle causes the spool 16 to rotate.

Figure 6:
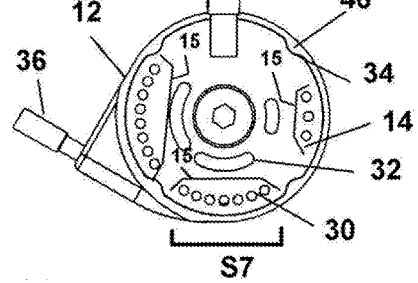
FIG. 6 depicts a side view of the device of FIG. 1, with the cable spool omitted, showing the index plate and base with the index plated rotated to a second as-used mode configured for a 3-speed gearing system.
Figure 8:
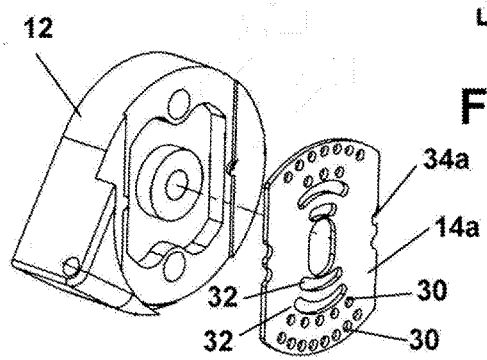
FIG. 8 depicts a view of another mode of the device showing the base and index plate, wherein the index plate is substantially rectangular in shape.
Figure 9:
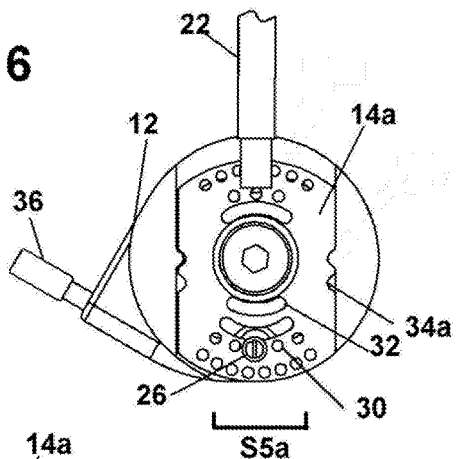
FIG. 9 depicts a side view of the device of FIG. 8, with the cable spool omitted, showing the index plate, base, lever, and biased ball, with the index plated positioned to a first as-used mode configured for a 5-speed gearing system.
Figure 10:
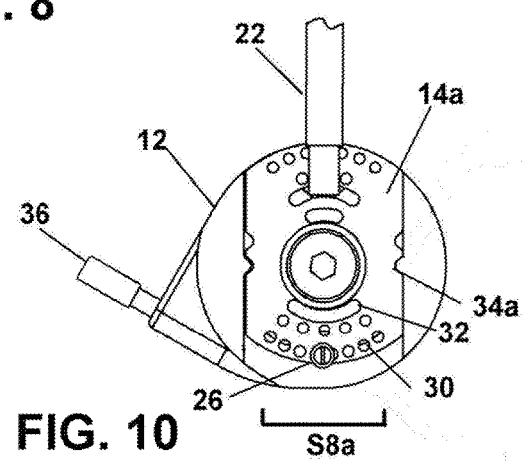
FIG. 10 depicts a side view of the device of FIG. 8, with the cable spool omitted, showing the index plate, base, lever, and biased ball with the index plated translated upward to provide a second as-used mode configured for an 8-speed gearing system.

As can be seen in FIGS. 1, 6, and 16 for instance, there are positioned a plurality of sets 15 of apertures 30, with each set 15 having sequentially spaced and a different number of apertures 30. Associated with each set 15 of apertures 30 is a limiting slot 32 extending in an arch a length around a central point of the index plate 14, around which all of the sets 15 of sequentially spaced apertures 30 extend in individual arched lines of sequentially spaced apertures 30 in each set 15.

The spaced relationship of each aperture 30 from the other in each respective set 15 of indexing apertures 30 is such that the space between any two adjacent apertures 30 in any set 15 corresponds to cable 18 translation length requirements of respective different commercially available cable pull and gear shifting configurations. The number of apertures 30 in any given set 15 corresponds to the number of gearing shifts that the engaged system of gears or derailleur and sprocket allows from one selection.

Consequently, from the plurality available, the user may choose the desired individual set 15 of indexing apertures 30 which has sequential aperture 30 spacing in distances which, when the spool 16 is rotated, have detent points engaging a projection from the spool 16 and which match the individual cable translation requirements to achieve the shift points of a particular internally geared hub or derailleur gear system engaged to the distal end of the cable 18. Thus, upon a selection of a set 15 determined by the user, the shifter device 10 is configurable to translate a precise length of cable 18, in a number of precise preset increments determined by detent or aperture 30 spacing and the number thereof, as a shifting lever 22 is pulled to rotate the spool 16 relative to the fixed position of the index plate 14. The shifting lever 22 may include a knob 24 disposed at its distal end to aid the user in pulling the lever 22 as needed. The spool 16 should have means to temporarily engage with the detents in the index plate 14 so as to discern, when such is engaged, a gear shift position has been achieved.

It should be noted that although the device 10 in the current mode is shown employing a shifting lever 22 as a means for ultimately rotating the cable spool 16 for translating the cable 18 to change gearing, in other modes the device 10 may be suitably configured for employment with twist grip type as a means for rotating the cable spool and translating the cable 18, or other means for rotation of cable engaged components as are conventionally known in the art of gear shifting devices.

In use, the shifting lever 22 which is engaged at a first end to the cable spool 16, when pushed, rotates the cable spool 16 to translate a length of cable 18 toward or away from the device 10. This translation in defined lengths in preset increments determined in number, and length, by each increment of the spacing and the number of indexing engageable detents or apertures 30 in the selected set 15 on the index plate 14.

Because strong users might overpower the system and push the handle to move the engaging component out of frictional engagement with a last aperture 30 of a set 15 of apertures, and thereby overshift, in a preferred mode, a limiting pin 28 is engaged to and projects from the cable spool 16 and extends to a distal end which communicates into at least one limiting slot 32 disposed on the index plate 14. This engagement of limiting pin 28 and slot 32, which limits cable translation to a defined length relative to the maximum translation of the cable 18 for a specific engaged gearing system, in either direction, in the slot 42 extending around a central area fo the index plate 14, provides a means for limiting the overall cable throw and translation of the cable 18 for a particular aperture set 15 chosen. As noted, this insures the cable 18 is never translated past the operational limits of the particular gear system to which the related set 15 of apertures relates as well as the slot 32.

The cable 18 preferably engages with the cable spool 16 using means of engagement such as a cable retaining slot 21 or track. Those skilled in the art will recognize that the cylindrical nipple end 20 conventionally employed on Bowden cables 18 may be employed for securing the cable 18 in its operative engagement with the cable spool 16. Further, the device 10 may include a cable adjuster 36, which when rotated in a threaded engagement with the base 12, provides a means for adjusting the length of the cable housing 38, or sheath covering the cable 18, relative to the fixed length of the cable 18, as needed.

Particularly preferred in the device 10, means for temporary biased engagement of the cable spool 16 to one of the detents or apertures 30 in a set 15, is herein provided by a biased ball 26. For example, a spring-loaded ball bearing engaged within, and projecting from a distal end of a cylindrical housing, is preferably employed and engaged to project toward the index plate 14 from the cable spool 16 so as to have the distal end with the ball 26 projecting from the cable spool 16 toward the base 12 engage within each one of the detents such as the apertures 30 in a given set 15. Means for adjusting a bias force against the ball 26 to resist translation toward the cable spool 16, and also to adjust the force required to be imparted to rotate the spool 16 by pushing the handle, may be provided by an adjustment screw 27 which compresses the spring, or by changing the spring itself to a stiffer or less stiff spring.

The biased ball 26 projecting into detents, such as the apertures 30 of a chosen set 15 when the spool 16 is operationally engaged adjacent the index plate 14, provides a means for incremental positioning of the cable spool 16 during rotation to determinable stops at incremental distances in that rotation. The stops and distance between each incremental positioning is determined by the spacing of the selected index apertures 30 from each other in a selected set 15. This frictional engagement of the ball 26 into an aperture 30 allows the engaged spool 16 to rotate from force on the handle, and to stop at individual incremental steps, corresponding in both number and translation distance determined by the number and spacing of the set 15 of index apertures 30.

Again, the spacing and the type and number of the detents or index apertures 30, within a respective set 15, which are positioned to engage in this temporarily biased engagement with the biased ball 26, define the number of cable translations, and length of cable pull in such translations, in both directions of the cable from the distal end of the cable housing 38 or sheath. Thus, each partial rotation of the cable spool 16, by the lever 22, will translate the cable a distance relative to the gear selection configuration associated with the adaptively engaged gear system.

In the current mode, the index plate 14 of the disclosed invention is preferably substantially circular, and formed of a planar rigid material, such as aluminum or other suitable metal or material. In use the index plate 14 is affixed in a registered engagement to the base 12 in-between a plurality of protrusions 46, or recessed within a cavity 44, or between a plurality of protrusions 46 projecting from the base 12 to a registered position therewith. So engaged, the index plate 14 is positioned between the cable spool 16 when it is rotationally engaged with the base 12 in biased contact with the apertures 30.

Means for registered engagement of the index plate 14 to one or more rotational positions relative to a center of the base 12, where each registered position places on of the sets 15 of apertures 30 in position for operative engagement with the biased ball 26, is preferably provided means for engagement of the perimeter of the plate 14 such as by plurality of indents 34 disposed on the circumference of the index plate 14 which extend radially inward from the circumferential edge of the plate 14 towards the center of the plate 14.

Multiple mating protrusions extending from the base 12 extend to positions spaced to engage and register with multiple respective indents 34 in the index plate 14. Each such registered engagement prevents the index plate 14 from rotating in its engagement to the plate. Further, the protrusions engage with matched detents 34 position the plate 14 rotationally around a center of the base 12 position sets 15 of apertures 30 in position to engage the biased ball 26 extending from engagement with the spool 16. The index plate 14 can have one or a plurality of such sets 15 and during installation the user would engage the detents 34 with the protrusions to operatively position a matching set 15 of apertures 30 for the engaged gear train to the distal end of the cable 18.

As shown in FIGS. 15-17, this registered engagement may be rotationally adjusted within the confines of the protrusions since they are spaced to either specific, or all of the detents 34 when the index plate 14 is rotated. Also shown is the configuration of the engagement of the detents 34 with protrusions 46 where the protrusions 46 surround a cavity 44 to operatively place the appropriate set 15 of apertures 30 in operative alignment with the biased ball 26. Either way of registering the index plate 14 with the base 12 to concurrently allow for differing rotational positioning of the index plate 14 relative to the base, to adapt position different sets 15 of apertures 30 for interface with the ball 26, and to allow for rotation of the base 12 for differing angled mounting engagements with a bike, may be employed.

As shown in FIGS. 15-17, the housing 38 or sheath enables engagement of the device 10 to differing frames while still positioning the lever 22 substantially upright. Of course, other means to position the plate 14 in such a registered engagement may be employed but the current preferred mode is forming the interior of the cavity 44 to register with the plate 14 in differing rotational orientations such as protrusions positioned to register with indents 34.

For example, in another means for rotational registration within the cavity 44 for the plate 14, the circumference of the plate 14 may have a shape matching that of the interior circumference of the cavity 44 at multiple positions, and thereby provide the means for rotational positioning for registration of a set 15 of apertures 30, with a biased ball 26 or other means for temporary positioning within apertures 30 in a sequential set 15, which acts on the rotation of the spool to allow incremental rotation and thus incremental translation of the engaged cable.

Figure 2:
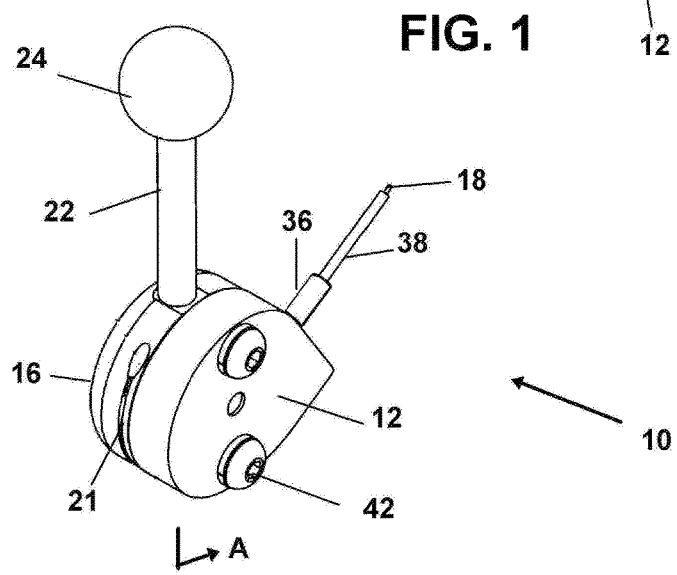
FIG. 2 shows a perspective assembled view of the device of FIG. 1.

A pivot bolt 40 and various hardware 42 may be employed to secure the device 10 to its assembled mode as shown in FIG. 2 wherein the cable spool 16 rotates around an axis defined by the bolt 40. The bolt 40 extends axially through the base 12, index plate 14, and cable spool 16 such that the spool 16 is permitted to rotate relative to the base 12 and rotates in incremental lengths determined by the ball 26 engaging the apertures 30 of a set 15 formed in the base-engaged index plate 14.

In all modes, the index plate 14 includes one or a plurality of sets 15 of index apertures 30 in a sequenced positioning. The index aperture sets 15 are defined by the quantity and spacing of the index apertures 30 in that particular set 15. For example, in the current mode, a plurality of index aperture sets 15 shown as S3, S7, S8 are provided by sets 15 of sequentially positioned apertures 30, and are in 90 degree opposed configurations on the plate 14.

Each set 15 or, S3, S7, S8 provides a different plurality of index apertures 30 at pre-defined sequential spacings and having a corresponding limiting slot 32. In configuring the device 10 for use, the user will selectively position the index plate 14 in its engagement in the base 12, in order to align the biased ball engaged to the cable spool 16 in a position to engage the appropriate set 15 of apertures 30 having the sequential number and spacing to achieve the cable pull requirements determined by that particular set 15 which matches the derailleur or gear train engaged to the cable.

Currently, adjustment to position the appropriate set 15 of apertures 30 to a registered position in the cavity 44, to engage with the biased ball 26, is accomplished by turning the index plate 14 in 90 or other degree rotations as needed.

Figure 5:
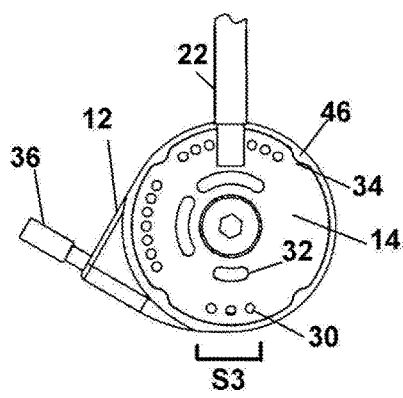
FIG. 5 depicts a side view of the device of FIG. 1, with the cable spool omitted, showing the index plate in registered engagement with a base in a first as-used mode configured for a 3-speed gearing system.
Figure 7:
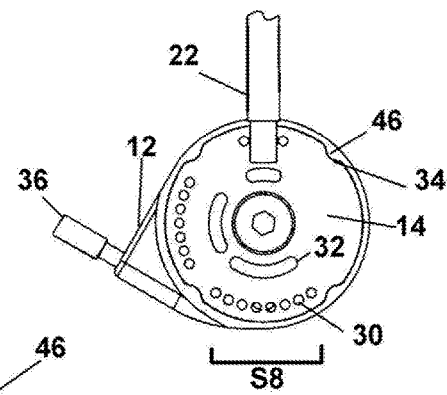
FIG. 7 depicts a side view of the device of FIG. 1, with the cable spool omitted, showing the index plate and base with the index plated rotated to a third as-used mode configured for a 8-speed gearing system.

In FIG. 5, FIG. 6, and FIG. 7, the index plate 14 is shown in different positions to allow operative engagement of the biased ball for corresponding to 3-speed (S3), 7-speed (S7), and 8-speed (S8) gearing systems, respectively. It is noted that in these figures, the cable spool 16, which has incremental rotation determined by the positioning of the biased ball 26 within the sequentially located apertures 30 in a set 15, is omitted in order to show the index plate 14.

It is additionally noted that the spacing of the sequentially positioned apertures 30 in any set 15 will vary depending on cable pull or translation requirements of the known gear systems to change positions to initiate movement to operatively engage the chain or drive belt to gears of varying size. Thus, it is possible that one index plate 14 may have a plurality of sets 15 of index apertures 30, each having different spacings, wherein each set 15 will have a number and sequential spacing of apertures 30 which will correspond to known cable pull length requirements for known gear systems.

It is intended that the construction of the index plate 14 can be varied to provide users with a plurality of different index aperture set 15 options for selecting the desired cable pull configuration required for their bike. As such, in yet another particularly preferred mode shown in FIG. 8, FIG. 9, FIG. 10, FIG. 11, and FIG. 12, a substantially rectangular index plate 14*a* is provided and includes sets 15 of index apertures (S3*a*, S5*a*, S7*a*, S8*a*) disposed on both upper and lower regions of the plate 14, opposed 180 degrees from each other.

In this mode, the base 12 is provided with a similarly shaped mating cavity for receiving the plate 14 in registered positions around the axis. Similar to the previous mode, registering protrusions are also provided. However, in this mode the index plate 14*a* is provided with one or a plurality of vertically opposed indents 34*a*, as shown. Thus, the user can both simply rotate the plate 180 degrees in its engagement to the base, as well as position the plate 14 in either a lower or upper configuration relative the base, within the cavity, to operatively position the desired index set 15 in an aligned registered engagement with the biased ball 26 of the cable spool 16. As clearly seen in FIG. 9, FIG. 10, FIG. 11, and FIG. 12, different possible as-used positions of the index plate 14*a* for 5-speed S5*a*, 8-speed S8*a*, 3-speed S3*a*, and 7-speed S7*a* gearing configurations, respectively, are depicted.

In yet another preferred mode, shown in FIG. 13, the index plate 14*b* can be formed of substantial thickness such that a first side surface 17 of the plate 14*b* can employ any desired combination of sets 15 of index apertures 30 and corresponding limiting slots 32 which extend a first distance (less than the thickness of the plate) into the plate 14*b*, while the other side surface (not shown), opposite the first surface 17, can employ any suitable combination of different sets 15 of index apertures 30 also extending a distance less than the thickness of the plate. The base 12, as such, may have a cavity 44*b* depth formed to accommodate the plate 14*b* thickness. Thus, the user will simply reverse the index plate 14*b* in its engagement to the base in order to employ one of the index aperture sets 15 on either of the first side surface 17 or opposite side. Again, a rotation of the index plate 14*b* in 90 degree turns will allow the user to access the desired set 15 as needed.

In still yet another preferred mode, shown in FIG. 14, a plurality of index plates 14*c* disposed in a stacked arrangement, can be engaged within the device 10. The index plate 14*c* positioned adjacent the cable spool 16 (in the current depiction, this is the index plate 14*c* with the numeral '1') is the plate 14*c* which is positioned for an engagement with the biased ball 26 and, for convention, is referred to as the active index plate 14*c*. Therefor, the active index plate 14*c* is the plate 14*c* employed for selecting the desired index aperture set 15. Again, the base 12 may have a cavity 44*c* formed to accommodate the plurality of plates 14*c* and resulting thickness. Thus, the user can change the stacked arrangement of the index plates 14*c* such that the desired index plate positioned for active employment adjacent the cable spool 16 will be the plate 14*c* for selecting the desired gear shifting configuration of the shifting device 10.

FIGS. 15-17 depict the ability of the base 12 of the device 10 to be positioned, independent of the handle, to multiple engagement angles relative to the bike frame. This independent positioning allows for the base to be mounted to the frame in a manner to allow for an angle approach of the cable housing and cable with the base, which will insure smooth shifting, because if the angle of the cable housing 38 to the line of the cable 18 leaving the base 12 is not aligned, sticking of the cable 18 translating inside the housing 38 can occur. So engaged, rotated to allow for an alignment of the cable 18 with the housing 38 extending from the base 12, the base 12 still accommodates registered positioning of the index plate 14 to communicate with the ball and allow an upright positioning of the handle 22 in an ergonomically employable position for the rider during use.

It is briefly noted that, upon a reading this disclosure, those skilled in the art will recognize various means for carrying out the intended features and operations of the invention. As such, it is to be understood that other devices, applications, and systems employing suitable components may be configured to carry out these features and are, therefor, considered to be within the scope and intent of the present invention, and are anticipated.

It is also noted that the provisions of the any of the features of any of the preferred modes of the invention may be employed singularly or in any suitable combination with any of the other features of the other preferred modes of the invention and should not be considered limited by their depictions in the figures. Those skilled in the art will readily recognize the slight or moderate modifications needed to accomplish these combinations, and are anticipated.

This invention has other applications, potentially, and one skilled in the art could discover these. The explication of the features of this invention does not limit the claims of this application; other applications developed by those skilled in the art will be included in this invention.

Further, although the device is shown in its most simple form, various components and aspects of the device may be differently shaped or slightly modified when forming the invention herein. As such, those skilled in the art will appreciate the descriptions and depictions set forth in this disclosure are merely meant to portray examples of preferred modes within the overall scope and intent of the invention, and are not to be considered limiting in any manner.

While all of the fundamental characteristics and features of the invention have been shown and described herein, with reference to particular embodiments thereof, a latitude of modification, various changes, and substitutions are intended in the foregoing disclosure and it will be apparent that, in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications, variations, and substitutions are included within the scope of the invention as defined by the following claims.

What is claimed:

1. A gear shifting apparatus adapted for engagement to a bicycle or other device employing a translating cable which translates a distance to actuate sequential shifts in a gear train, comprising:
   a base, said base having a first side and a second side adapted for engagement to said bicycle;
   a cable spool, said cable spool rotationally engaged to rotate about an axis in a position adjacent said second side of said base;
   a cable engaged at a first end with said cable spool and adapted at a second end for an engagement with an actuator for shifting gearing;
   an index plate, said index plate having at least one set of detents formed into a first side opposite a second side of said index plate, said detents spaced in sequential positions along an arced line;
   said index plate in a removable engagement in-between said cable spool and said first side of said base, said removable engagement comprising an engagement of a plurality of recesses formed in a circumferential edge of said index plate with a plurality of projections extending from said first side of said base where said projections are in positions to form an engagement with said recesses which holds said index plate in a fixed position relative to said base;
   said index plate engaged to said removable engagement locating said at least one set of detents to an aligned position with said cable spool;
   said cable spool removably engageable to a respective temporary individual contact with each of said detents in said at least one set of detents when located to said aligned position, during rotation of said cable spool about said axis;
   a rotation of said cable spool a distance, to move from a said respective temporary individual contact with a first said detent of said at least one set of detents, to said temporary individual contact with an adjacent said detent of said at least one set of detents, imparting a translation to said cable, said translation having a distance determined by a separation distance between said first detent and said adjacent detent.

2. The gear shifting apparatus of claim 1 additionally comprising:
   said at least one set of detents is comprised of a first plurality of individual sets of detents formed into said first side of said index plate;
   said recesses formed in said circumference edge of said index plate spaced to allow rotation of said index plate to a plurality of registered positions and in each of said registered positions, achieve engagement of said projections with said recesses;
   each of said registered positions placing said index plate in a different orientation relative to said base;
   each said different orientation, positioning a different one of said first plurality of individual sets of detents in said aligned position with said cable spool.

3. The gear shifting apparatus of claim 2 wherein said temporary individual contact of said cable spool with each of said detents comprises:
   a projection extending from a connection of a first end thereof to a side of said cable spool positioned adjacent said index plate;
   a ball slidably located at a second end of said projection opposite said first end;
   said ball biased in a direction toward said second side of said base; and
   rotation of said cable spool causing a concurrent movement of said ball from a temporary engagement with one detent in a respective said set of detents of said first plurality of individual sets of detents, to a temporary engagement with an adjacent said detent in said respective said set of detents of said plurality of individual sets of detents.

4. The gear shifting apparatus of claim 3 additionally comprising:
   each individual set of said first plurality of individual sets of detents formed into said first side of said index plate, configured to actuate said sequential shifts in said gear train, whereby said index plate may be rotated in an orientation with said base, to position each individual set of detents from said first plurality of individual sets of detents formed into said first side of said index plate, which matches said gear train engaged with said user's bicycle, to said aligned position with said cable spool.

5. The gear shifting apparatus of claim 3 additionally comprising:
   each of said plurality of individual said sets of detents formed into said first side of said index plate corresponding to a respective individual limiting slot from a plurality of said limiting slots formed in said index plate;
   each respective individual limiting slot corresponding to a respective individual set of detents positioned to said aligned position with said cable spool, being in a sliding engagement with a projection extending from said cable spool toward said base; and
   a length of each said limiting slot, limiting a maximum rotation of said cable spool when said projection contacts one end of each limiting slot.

6. The gear shifting apparatus of claim 2 additionally comprising:
   said index plate having at least one set of detents formed into said first side and at least one set of detents formed on said second side; and
   said index plate reversible in said removable engagement upon said first side of said base.

7. The gear shifting apparatus of claim 2 additionally comprising:
   a second plurality of individual sets of detents formed into said second side of said index plate; and
   said index plate reversible in said removable engagement upon said first side of said base.

8. The gear shifting apparatus of claim 2 additionally comprising:
   each individual set of detents of said first plurality of individual sets of detents formed into said first side of said index plate, configured to actuate said sequential shifts in said gear train, whereby said index plate may be rotated in an orientation with said base, to position a respective said set of said detents from said first plurality of individual sets of detents which matches said gear train engaged with said user's bicycle, to said aligned position with said cable spool.

9. The gear shifting apparatus of claim 8 additionally comprising:
   each of said first plurality of individual sets of detents formed into said first side of said index plate corresponding to a respective individual limiting slot from a plurality of limiting slots formed in said index plate;
   each respective individual said limiting slot corresponding to a respective individual set of detents positioned to said aligned position with said cable spool, being in a sliding engagement with a projection extending from said spool toward said base; and
   a length of each said limiting slot, limiting a maximum rotation of said spool when said projection contacts one end of said limiting slot.

10. The gear shifting apparatus of claim 2 additionally comprising:
   each of said first plurality of individual sets of detents formed into said first side of said index plate corresponding to a respective individual limiting slot from a plurality of said limiting slots formed in said index plate;
   each respective individual limiting slot corresponding to a respective individual set of detents positioned to said aligned position with said cable spool, being in a sliding engagement with a projection extending from said spool toward said base; and
   a length of each limiting slot, limiting a maximum rotation of said cable spool when said projection contacts one end of each limiting slot.

11. The gear shifting apparatus of claim 1 wherein said temporary individual contact of said cable spool with each of said detents comprises:
   a projection extending from a connection of a first end thereof to a side of said cable spool positioned adjacent said index plate;
   a ball slidably located at a second end of said projection opposite said first end of said projection;
   said ball biased in a direction toward said second side of said base; and
   rotation of said cable spool causing a concurrent movement of said ball from a temporary engagement with one detent in said at least one set of detents, to a temporary engagement with an adjacent said detent in said at least one set of detents.

* * * * *